United States Patent
Guimbretiere

[11] Patent Number: 5,149,309
[45] Date of Patent: Sep. 22, 1992

[54] DIFFERENTIAL TRANSMISSION DEVICE AND CONTROLLED-SLIP COUPLING

[75] Inventor: Pierre Guimbretiere, Neauphle-Le-Chateau, France

[73] Assignee: Glaenzer Spicer, Poissy, France

[21] Appl. No.: 697,186

[22] Filed: May 8, 1991

[30] Foreign Application Priority Data

May 11, 1990 [FR] France .................... 90 05907

[51] Int. Cl.[5] ...................... F16H 1/44
[52] U.S. Cl. .................... 475/234; 475/84; 475/86; 475/87; 475/235
[58] Field of Search ........... 475/84, 86, 87, 234, 475/235

[56] References Cited

U.S. PATENT DOCUMENTS

| | | | |
|---|---|---|---|
| 3,815,443 | 6/1974 | McAninch et al. | 475/235 |
| 3,929,036 | 12/1975 | Shealy | 475/235 |
| 4,245,525 | 1/1981 | Le Begue | 475/235 |
| 4,290,321 | 9/1981 | Wilson | 475/235 |
| 4,412,459 | 11/1983 | Goscenski, Jr. | 475/86 |
| 4,594,913 | 6/1986 | Opitz | 475/235 |
| 4,757,727 | 7/1988 | Teraoka et al. | 475/87 X |
| 4,906,812 | 9/1975 | Kagata | 475/235 |
| 4,939,953 | 7/1990 | Yasui | 475/235 X |
| 4,989,687 | 2/1991 | Kwoka et al. | 475/87 X |

FOREIGN PATENT DOCUMENTS

| | | |
|---|---|---|
| 0193160 | 9/1986 | European Pat. Off. |
| 3609148A1 | 10/1986 | Fed. Rep. of Germany |
| 3630974 | 4/1987 | Fed. Rep. of Germany |

Primary Examiner—Rodney H. Bonck
Assistant Examiner—Daniel Wittels
Attorney, Agent, or Firm—Harness, Dickey & Pierce

[57] ABSTRACT

This device, comprising a housing (10), an input member and two output members (14, 15) as well as a controlled-slip coupling device (23) arranged between two of the said input and output members, is characterized in that the differential comprises at least one member (14) axially movable under the effect of a torque exerted on it, the displacement of this member being utilized to modify the operating characteristics of the controlled-slip coupling.

This provides a differential with a slip self-controlled as a function of the torque and of the speed difference between the output members, the law of variation of which is appreciably improved in relation to that of the known devices.

16 Claims, 5 Drawing Sheets

DIFFERENTIAL TRANSMISSION DEVICE AND CONTROLLED-SLIP COUPLING

The present invention relates to differential transmissions used especially in motor vehicles.

These differentials comprise an input member and two output members mounted rotatably about the same axis, in one installation example the two output members being connected to driving wheels of the vehicle by means of lateral transmission shafts. In another configuration, the two output members can be connected respectively to the input member of two other differentials.

Attempts have been made to improve the operation of these differentials by associating with them devices for blocking or limiting the slip.

A first type of self-blocking differential comprises at least one friction clutch interposed between two of the said output and input members, this clutch being controlled by at least one member which is movable within the differential and the position of which is a function of the torque which passes via this differential.

A second attempt to improve the operation of a differential involved associating with it a coupling device with discs and with viscous fluid which works on the shearing stress and which can be designated by the expression "viscocoupler", such a device being interposed between two of the said input and output members of the differential. In this second instance, the difference in rotational speed between the two members between which the viscocoupler device is interposed determines the braking efficiency of the latter.

However, these two types of devices have disadvantages arising as a result of the fact that, in one case, the control of the clutch takes into account virtually only the torques passing via the differential and the sign of the speed difference between the output members, whilst the second case takes into account only the speed difference between the members between which the viscocoupler device is interposed. In both cases, this results in unchangeable and therefore unsuitable characteristics of variation of the torque as a function of the speed difference.

These disadvantages are revealed particularly, as regards the first type of device, in wheel-deflecting difficulties during parking manoeuvres or in the generation of high transferred torques, the direction of which can change abruptly between wheels or between axles, whereas the ground allows only low driving or braking torques, and, where the second type is concerned, in poor adaptation to use with wheel anti-lock brake systems (ABS).

The object of this invention is to provide a device which makes it possible to overcome most of these disadvantages and which has a wider range of use than the known devices.

For this purpose, the subject of the invention is a differential comprising an input member and two output members as well as a controlled-slip coupling device arranged between two of the said input and output members, characterised in that at least one of the said input and output members is axially movable under the effect of a torque exerted on it, the displacement of this member being utilised to modify the operating characteristic of the controlled-slip coupling device.

According to other characteristics:

the controlled-slip coupling device is of the type with discs and with viscous fluid working under shearing stress;

the displacement of the said movable member varies the internal pressure of the viscous fluid and/or the distance between the discs in the coupling device;

the movable member comprises an axial extension which can slide sealingly between part of the housing and a shaft, the end of this axial extension delimiting part of the containment of the controlled-slip coupling device and/or being capable of interacting with a plate for bringing together the discs which is provided in the coupling device;

the housing comprises a wall separating a first containment containing the differential from a second containment containing the coupling device, this wall having at least one duct, in which is received a sliding member, one end of which bears against the movable member and the other end of which partially delimits the second containment and/or can come to bear against a plate for clamping the discs of the coupling device;

the coupling device has a cover, and there is a front denture coupling between the movable member of the differential and this cover.

The invention will be described in more detail below with reference to the accompanying drawings which are given solely by way of example and in which.

Figure 1:
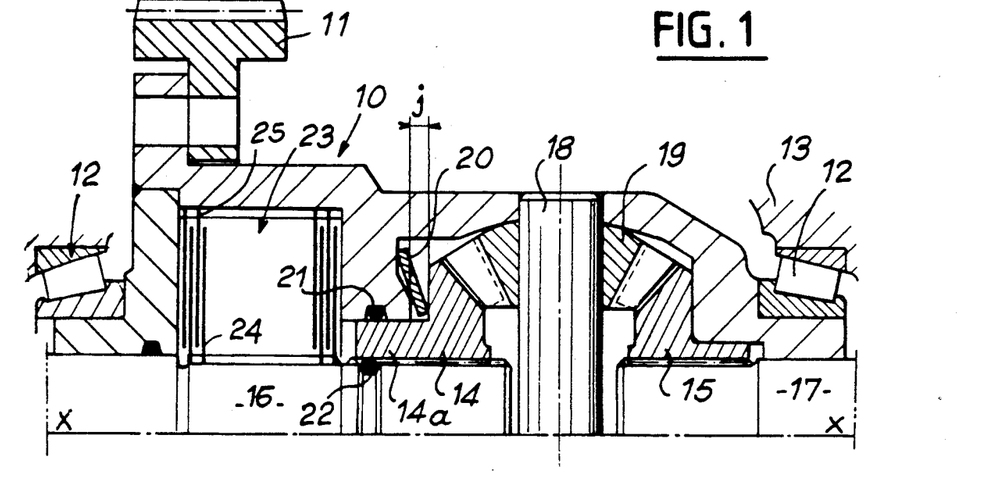
FIG. 1 is a diagrammatic sectional half-view of a first embodiment of a differential according to the invention.

FIG. 1 shows a differential comprising a housing 10 fixed to a ring 11 and forming the input member of this differential, this housing being mounted rotatably in bearings 12 in relation to a frame 13. Mounted rotatably in this housing about the same axis X—X are two sun gears 14, 15 which constitute the output members of the differential and which are connected respectively to shafts 16 and 17. Furthermore, the housing carries at least one planet gear axle 18, on which are ranged planet gears 19 meshing with the sun gears 14, 15. The sun gear 15 bears in the conventional way on the housing of the differential, whilst the sun gear 14 is mounted slidably relative to this housing, its hub having an axial extension 14a. Some axial play j is provided between this sun gear and the adjacent face of the housing. A spring consisting, for example, of a Belleville washer 20 can be provided between the housing and the sun gear. Moreover, two sealing members 21, 22 are arranged respectively between the inner and outer walls of the extension 14a and the housing 10 and shaft 16.

Seated inside the housing 10 on the same side as the sun gear 14 is a controlled-slip coupling device 23 of the type comprising two series of alternating discs 24, 25, a first series 24 being made integral in terms of rotation by means of splines with the output shaft 16 associated with the sun gear 14, whilst the other series of discs 25 is made integral in terms of rotation by means of splines with the differential housing. These discs are immersed in a viscous fluid which works under shearing stress and which, for example, can be a silicone oil.

Such a device operates as follows: in the absence of any drive torque, the coupling device 23 is governed or controlled only by the difference in rotational speeds between the housing 10 and the output shaft 16 associated with the sun gear 14. The latter occupies its position shown in FIG. 1. With the characteristic $Cv=f(\Delta n)$ being selected somewhat low (Cv being the resistant torque attributable to the viscocoupler and $\Delta n$ being the difference in rotational speeds between the housing and the shaft 16), such an assembly opposes only little reluctance to manoeuvres at very low speed.

As soon as a drive torque is transmitted to the wheels, forces are exerted between the toothings of the planet gears and of the sun gears, the latter tending to come to bear on the housing. The sun gear 14 is therefore brought to displacement, at the same time compressing the spring 20. The effect of this displacement is to reduce the volume presented to the viscous fluid in the containment delimited by the housing 10, the shaft 16 and the end of the sun gear 14. This results in a reduction in the volume of the containment and an increase in the internal pressure of the fluid and therefore a modification of the characteristic law $Cv=f(\Delta n)$, thereby making the viscocoupler the more effective, the higher the drive torque.

Figure 2:
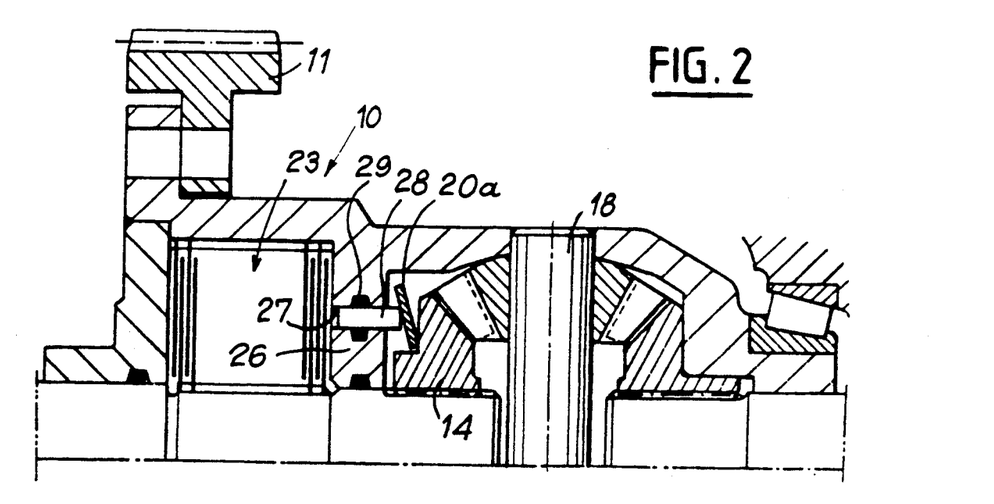
FIG. 2 is a partial sectional view of an alternative version.

In the embodiment of FIG. 2, the same reference numerals denote elements corresponding to those of FIG. 1.

The containment in which the viscocoupler 23 is located is separated from the part of the housing 10 receiving the differential mechanism by means of a housing wall 26 sealed relative to the shaft 16. The axial extension 14a of the sun gear does not extend between this wall and the shaft 16. At least one duct 27 is made in the wall 26, and in this is received a sliding shuttle 28 surrounded by a gasket 29. This shuttle bears against one face of the sun gear directly or by means of a spring 20a, so that this device functions in exactly the same way as the preceding one, the difference being that the variation of the characteristic of the viscocoupler can be more progressive than in the embodiment of FIG. 1, since the displaced quantity of fluid is smaller.

Of course, the differential can comprise a plurality of shuttles, such as the shuttle 28, and if appropriate these shuttles can have different lengths so that the variation of the characteristic obtained during the displacement of the sun gear can be modulated.

Figure 3:
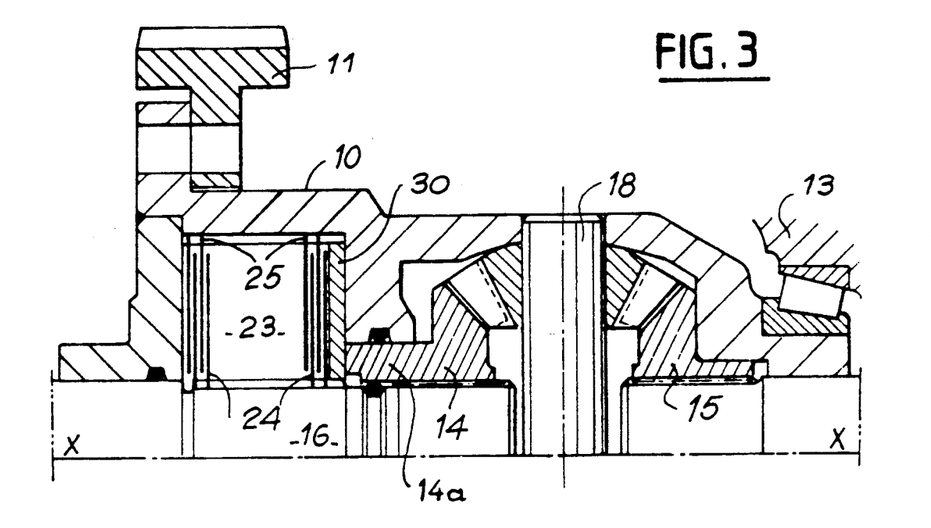
FIGS. 3 and 4 are two diagrammatic sectional half-views of two other alternative embodiments.

The differential illustrated in FIG. 3 comprises some members similar to those already described in relation to FIGS. 1 and 2 and consequently bearing the same references. In this embodiment, the viscocoupler comprises an additional plate 30 free to be displaced axially, but bearing at rest on the housing. The end of the sun gear 14 just comes into contact with this plate when the drive torque is zero. The cross-section of the axial extension of the sun gears 14 can be relatively small. In general terms, the operation of the device is similar to that described in relation to FIGS. 1 and 2. However, in FIG. 3, the modification of the characteristic of the viscocoupler device is obtained, during a displacement of the sun gears 14 to the left, by means of a corresponding displacement of the plate 30 which brings about a reduction in the spacing between the discs 24, 25.

Figure 4:
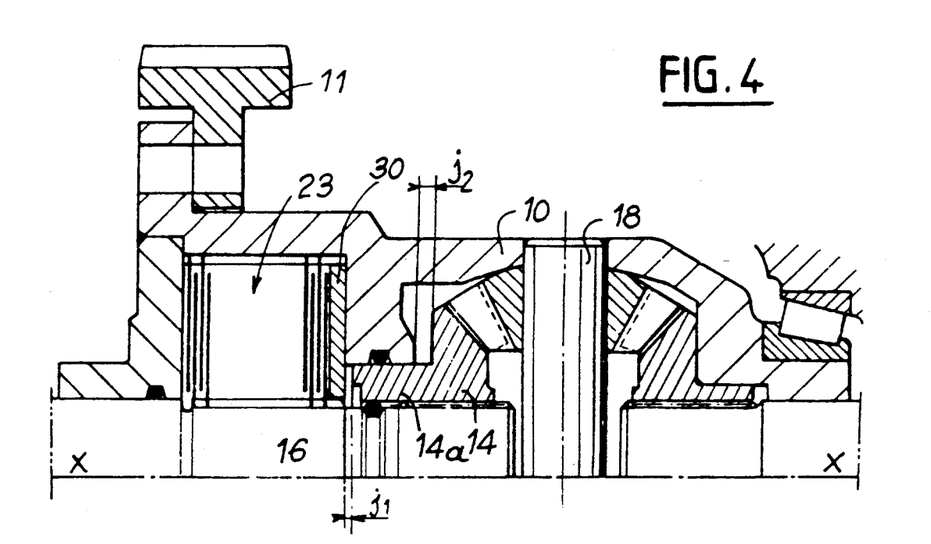

In the embodiment of FIG. 4, the two types of solution illustrated in FIGS. 1 and 3 have been combined. For this purpose, there is a play $i_1$ between the rear end of the axial extension 14a of the sun gears 14 and the plate 30, this play being smaller than that $i_2$ existing between the rear face of the sun gears and the adjacent face of the housing. It will therefore be appreciated that, in this case, in a first step the displacement of the sun gears 14 to the left causes a modification of the characteristic of the viscocoupler as a result of a modification of the internal pressure of the fluid, whilst, in a second step, the displacement of the plate 30 and the reduction in the spacing between the discs modify this characteristic.

Figure 5:
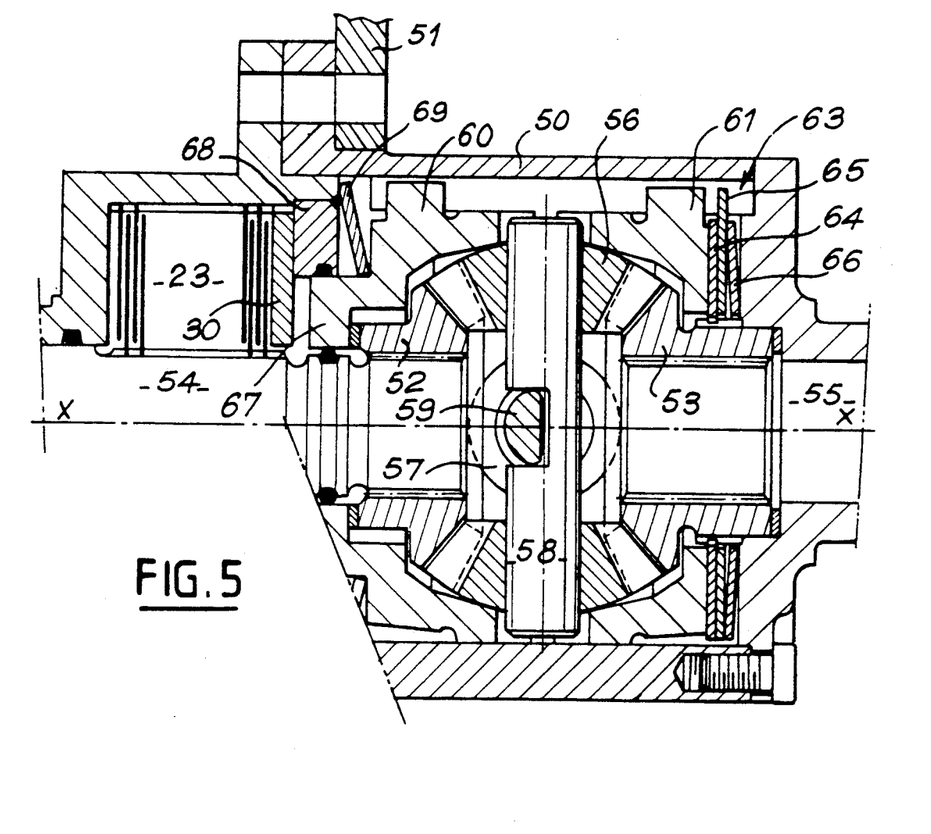
FIG. 5 is a sectional view of a differential corresponding to another version.
Figure 6:
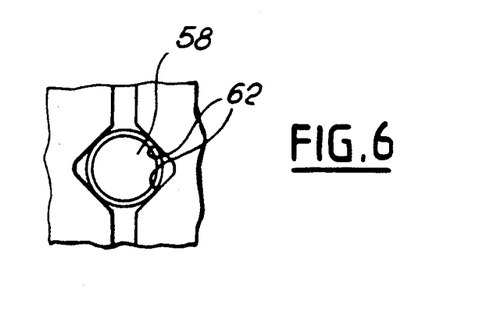
FIG. 6 is a sectional view along the line 6—6 of FIG. 5.

The differential illustrated in FIG. 5 comprises a housing 50 carrying a ring 51, two sun gears 52, 53 connected by means of splines to output shafts 54, 55 and two sets of planet gears 56, 57 carried respectively by two axles 58, 59 arranged at right angles. These two axles receive the pair of two half-shells 60, 61 mounted slidably inside the housing by means of splines and comprising opposed V-shaped ramps 62 (FIG. 6), between which the ends of the planet gear axles are received. Between the half-shell 61 located on the right in the drawing and the adjacent wall of the housing is arranged a friction coupling 63 comprising, in the example illustrated, a disc 64 integral in terms of rotation with the sun gears 53 and disc 65 integral in terms of rotation with the housing 50. A spring consisting of a Belleville washer 66 is arranged between this clutch and the end wall of the housing.

The other half-shell 60 has a part 67 received slidably and sealingly between the output shaft 54 and a transverse wall 68 of the housing. A spring consisting of a Belleville washer 69 is provided between this half-shell and the housing. Arranged on the other side of the wall 68 is a viscocoupler 23 which can take the form shown in any one of FIGS. 1 to 4. In the chosen example of FIG. 5, the coupler comprises a plate 30, against which the rear face of the half-shell 60 can come to bear after it has been displaced some distance to the left.

The operation of this device is similar to that described above, except for the fact that it is the half-shell 60 which determines the modification of the characteristic of the viscous fluid coupling as a function of the drive torque to be transmitted.

Figure 7:
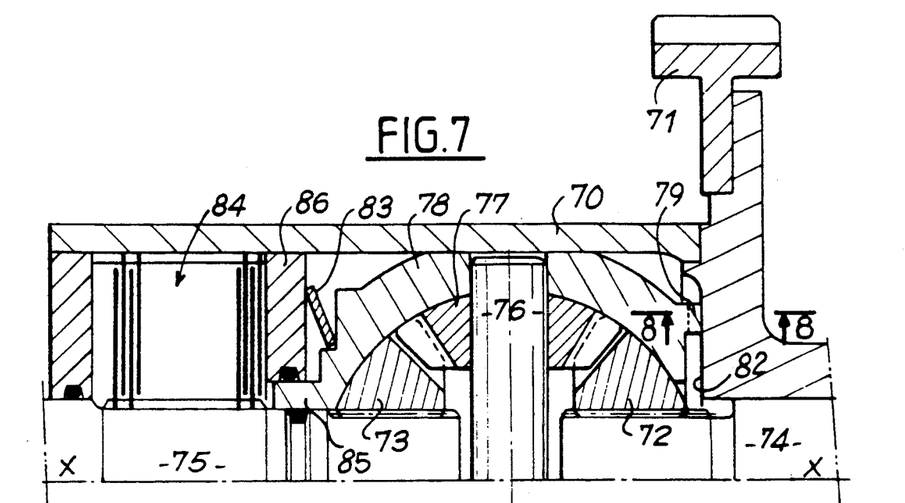
FIG. 7 is a sectional view of another version.
Figure 8:
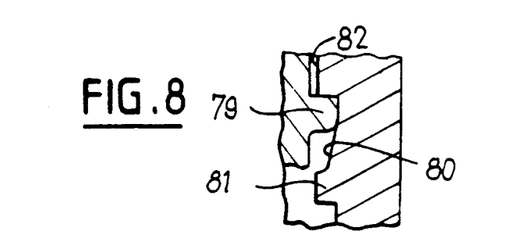
FIG. 8 is a sectional view along the line 8—8 of FIG. 7.

The differential illustrated in FIGS. 7 and 8 comprises, as before, a housing 70 fixed to a ring 71, two sun gears 72, 73 connected to transmission shafts 74, 75, a planet gear axle 76 and satellites 77. In this case, the planet gear axle is carried by an inner housing 78 capable of sliding axially within the main housing 70. The inner housing and the outer housing possess complementary means making it possible to obtain an axial displacement of the inner housing under the effect of a relative angular displacement between these two housings. These means comprise, for example, two diametrically opposed dogs 79 carried by the inner housing and two inclined ramps 80 terminating in stops 81 provided on the opposite face 82 of the outer housing. A spring 83 is interposed between the two housings.

On the opposite side to these ramps, the outer housing is completed so as to comprise a viscous-fluid coupling device 84, such as that described in relation to the preceding examples, and interposed between the housing 70 and the shaft 75. The inner housing 78 has an axial extension 85 which extends sealingly between the wall 86 of the outer housing and the shaft 75, in the same way as the extension 14a of the planet wheel 14 in the example of FIG. 1.

During operation, in the absence of any torque the viscocoupler operates with a low characteristic which is a function of the speed differences present between the input member and the output shaft 75. When a drive torque is transmitted to the wheels, an angular movement tends to occur between the outer housing and the inner housing, thus bringing about a displacement of the latter to the left, as seen in FIG. 7, and this displacement is utilised, as in the preceding examples, to modify the operating characteristic of the viscocoupler.

Figure 9:
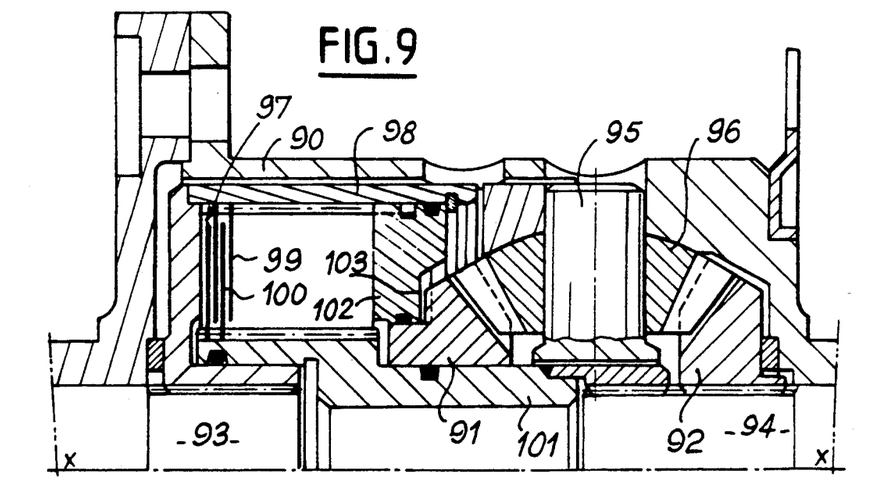
FIG. 9 is a partial sectional view showing a last alternative embodiment.

Finally, in the embodiment of FIG. 9, the device comprises a housing 90, two sun gears 91, 92 fixed to respective transmission shafts 93, 94 by means of splines, a planet gear carrier 95 and planet gears 96. A viscocoupler device 97 is accommodated in a housing 98 received inside the differential housing, and the two series of discs 99, 100 are respectively integral in terms of rotation, one 99 with the housing 98 and the other 100 with a hub 101.

The housing 98 is integral in terms of rotation with the shaft 93 and with the sun gear 91 by means of a flange or cover 102 connected to the sun gear 91 by means of front splines 103. The pressure angle of these splines is selected so as to match the pressure angle of the toothing of the sun gear.

As regards the hub 101, this is integral in terms of rotation with the shaft 94, so that the coupling device is interposed between the two output members of the differential. The variation of the characteristic of the viscocoupler is brought about by the slight axial displacement of the sun gear 91.

Figure 10:
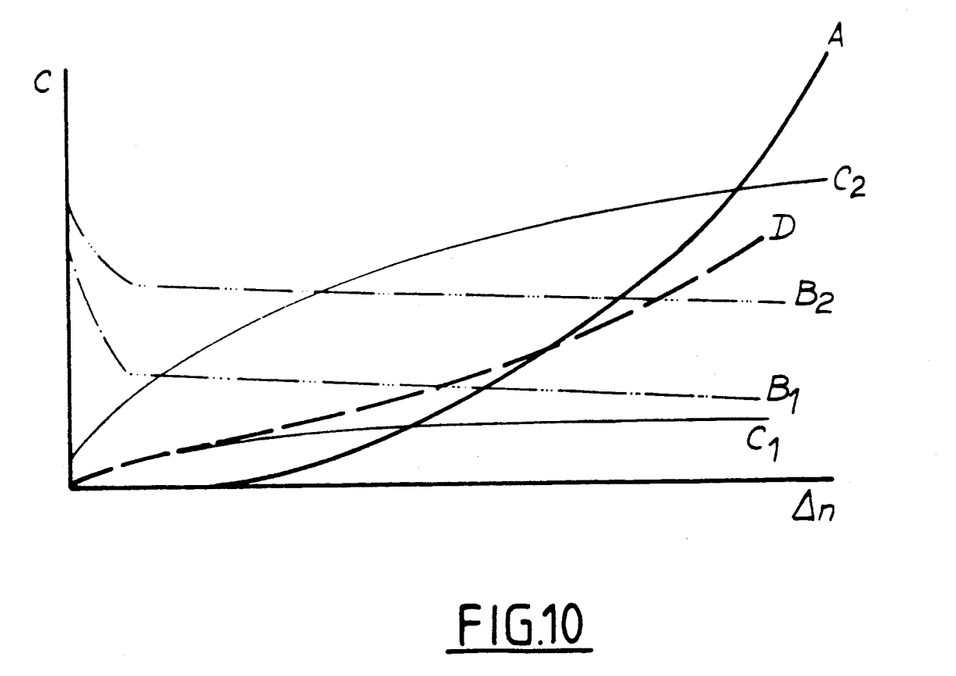
FIG. 10 is a graph illustrating the advantages of the device according to the invention.

The advantage of the invention in comparison with prior techniques is illustrated in FIG. 10, where a diagram (C, Δn) represents the characteristics of the two prior solutions, of the solution recommended here and of an "ideal" characteristic. The latter is designated by the reference A. The curves $B_1$ and $B_2$ correspond to solutions of the first category (with a friction clutch) for two calibrations of different values. The curves $C_1$ and $C_2$ illustrate two characteristics of known viscocoupler devices. The curve D corresponding to the invention comes closer to the ideal curve A.

It will be noted that, at the time when the device is assembled, the viscocoupler can be put under a reduced pressure, thereby making it possible to adopt a basic or nominal characteristic lower than that represented by the curve $C_1$.

It will also be noted that, in the figures, the axial plays, such as j, $j_1$, $j_2$, have been deliberately exaggerated.

I claim:

1. Transmission device, especially for a motor vehicle, which comprises a differential comprising an input member and two output members, said output members including a sun gear rotatable with a respective output shaft and at least one pair of planet gears meshed with said sun gears as well as a controlled-slip coupling device arranged between two of the said input and output members, and said sun gears and planet gears being positioned in a first containment and said coupling being positioned in a second containment, said first and second containments being separated by a sealing means, at least one of the said input or output members being axially movable under the effect of a torque exerted on it, the displacement of this member being utilized to modify the operating characteristic of the controlled-slip coupling.

2. Device according to claim 1, characterised in that the coupling device is of the type with discs and with viscous fluid working under shearing stress.

3. Device according to claim 2, characterised in that the displacement of the said movable member varies the internal pressure of the viscous fluid and/or the distance between the discs in the coupling device.

4. Device according to claim 2 characterised in that the coupling device with discs and viscous fluid is put under a vacuum.

5. Device according to any one of claims 1, 2 or 3, characterised in that the movable member is one of the differential sun gears which is mounted axially slidably in the housing.

6. Device according to claim 5 characterised in that the coupling device comprises a cover, and there is a front denture coupling between the movable member of the differential and this cover.

7. Device according to claim 5 characterised in that the housing comprises a wall separating said first containment containing the differential from said second containment containing the coupling device, this wall having at least one duct, in which is received a sliding member, one end of which bears against the movable member and the other end of which partially delimits the second containment and/or can come to bear against a plate bringing together the discs of the coupling device.

8. Device according to claim 5 characterised in that the movable member comprises an axial extension which can slide sealingly between part of the housing and its shaft, the end of this axial extension delimiting part of the containment of the controlled-slip coupling device and/or being capable of interacting with a plate bringing together the discs which is provided in the coupling device.

9. Device according to any one of claim 1, 2 or 3, characterised in that the movable member is an intermediate member mounted slidably in the housing in parallel with the common axis (X—X) of the input and output members and transmitting the torque between the housing and at least one planet gear.

10. Device according to claim 9, characterised in that the intermediate member is an inner housing carrying at least one planet gear axle, the housing and the inner housing having complementary means making it possible to obtain an axial displacement of the inner housing under the effect of a relative angular displacement between these two housings.

11. Device according to claim 9, characterised in that the intermediate member is a half-shell having inclined ramps bearing against at least one planet gear axle.

12. Device according to claim 1 characterised in that there is at least one elastic member for returning the movable member towards its position in which it does not modify the operating characteristics of the coupling device.

13. Device according to claim 1 characterised in that the coupling device is arranged between the input member and one of the two output members of the differential.

14. Device according to claim 1 characterised in that the coupling device is arranged between the two output shafts of the differential.

15. A transmission device comprising:

an input member;

two output members each including a sun gear rotatable with a respective output shaft and at least one pair of planet gears meshed with said sun gears;

a controlled slip coupling device arranged between said input member and one of said output members, said sun gears and planet gears being positioned in a first containment and said coupling being positioned in a second containment and said first and second containments being separated by a sealing means; and at least one of said sun gears being axially movable on its respective shaft under the effect of a torque exerted on it, the displacement of this member being utilized to modify the operating characteristics of the control-slip coupling.

16. A transmission device comprising:

an input member;

two output members each including a sun gear rotatable with a respective output shaft and at least one pair of planet gears meshed with said sun gears;

a controlled slip coupling device arranged between said input member and one of said output members, said sun gears and planet gears being positioned in a first containment and said coupling being positioned in a second containment and said first and second containments being separated by a sealing means; and at least one intermediate member surrounding one of said sun gears being axially movable under the effect of a torque exerted on it, the displacement of this member being utilized to modify the operating characteristics of the control-slip coupling.

* * * * *

UNITED STATES PATENT AND TRADEMARK OFFICE
CERTIFICATE OF CORRECTION

PATENT NO. : 5,149,309

DATED : September 22, 1992

INVENTOR(S) : Pierre Guimbretiere

It is certified that error appears in the above-identified patent and that said Letters Patent is hereby corrected as shown below:

item [56] Title page, under references cited, U.S. Patent Documents, "4,906,812" should be --3,906,812--.

Title page, under references cited, Foreign Patent Documents, "3609148A1" should be --3609418A1--.

Column 4, line 5, "$i_1$" should be --$j_1$--.

Column 4, line 7, "$i_2$" should be --$j_2$--.

Column 4, line 52, "satellites" should be --planet gear--.

Signed and Sealed this

Nineteenth Day of October, 1993

Attest:

BRUCE LEHMAN

*Attesting Officer*   *Commissioner of Patents and Trademarks*